United States Patent
Nakamori et al.

(10) Patent No.: US 10,013,408 B2
(45) Date of Patent: Jul. 3, 2018

(54) INFORMATION PROCESSING APPARATUS, INFORMATION PROCESSING METHOD, AND COMPUTER READABLE MEDIUM

(71) Applicant: FUJI XEROX CO., LTD., Tokyo (JP)

(72) Inventors: Yuki Nakamori, Kanagawa (JP); Kazunori Horikiri, Kanagawa (JP); Yusuke Kano, Kanagawa (JP); Nobuyuki Yamazoe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 137 days.

(21) Appl. No.: 14/286,458

(22) Filed: May 23, 2014

(65) Prior Publication Data
US 2015/0121191 A1    Apr. 30, 2015

(30) Foreign Application Priority Data
Oct. 28, 2013    (JP) .................................. 2013-223182

(51) Int. Cl.
*G06F 17/00* (2006.01)
*G06F 17/24* (2006.01)

(52) U.S. Cl.
CPC .................................. *G06F 17/241* (2013.01)

(58) Field of Classification Search
CPC .............................. G06F 17/241; G06F 17/24
USPC .................................. 715/230, 233, 232, 751
See application file for complete search history.

(56) References Cited

U.S. PATENT DOCUMENTS

| | | | |
|---|---|---|---|
| 5,596,694 A * | 1/1997 | Capps .................... | G06F 3/0481 345/473 |
| 7,107,268 B1 * | 9/2006 | Zawadzki .............. | G06Q 10/06 |
| 7,519,900 B2 * | 4/2009 | Zaher .................. | G06F 17/2229 715/230 |
| 7,610,352 B2 * | 10/2009 | AlHusseini ............. | H04L 67/38 709/204 |
| 7,661,067 B2 * | 2/2010 | Chen ................... | H04L 12/1822 709/206 |
| 7,698,644 B2 * | 4/2010 | Hawk ................... | G06F 3/0483 370/352 |

(Continued)

FOREIGN PATENT DOCUMENTS

| | | |
|---|---|---|
| JP | A-2002-269077 | 9/2002 |
| JP | 2003-233556 A | 8/2003 |

(Continued)

OTHER PUBLICATIONS

Gericke et al., Message Capturing as a Paradigm for Asynchronous Digital Whiteboard Interaction, IEEE 2010, pp. 1-10.*

(Continued)

*Primary Examiner* — Cong-Lac Huynh
(74) *Attorney, Agent, or Firm* — Oliff PLC

(57) ABSTRACT

An information processing apparatus includes a reception unit, a display, a detection unit, and a changing unit. The reception unit receives sticky note information indicating a sticky note to be attached to a mount sheet. The display displays the sticky note information received by the reception unit as a newly arrived sticky note on the mount sheet. The detection unit detects that a status of the newly arrived sticky note has changed. The changing unit changes display of the newly arrived sticky note for which a change is detected by the detection unit into display as a non-newly arrived sticky note.

16 Claims, 12 Drawing Sheets

(56) References Cited

U.S. PATENT DOCUMENTS

| | | | | |
|---|---|---|---|---|
| 7,730,392 | B2* | 6/2010 | Boyles | G06F 3/0481 |
| | | | | 715/233 |
| 7,904,827 | B2* | 3/2011 | Taniguchi | G09G 5/24 |
| | | | | 382/321 |
| 7,958,457 | B1* | 6/2011 | Brandenberg | G06F 1/1613 |
| | | | | 715/789 |
| 8,195,497 | B2* | 6/2012 | Montgomery | G06Q 10/06 |
| | | | | 705/7.13 |
| 8,683,317 | B2* | 3/2014 | Caldwell | G05B 23/0216 |
| | | | | 715/230 |
| 8,763,140 | B2* | 6/2014 | Marcus | G06Q 10/06 |
| | | | | 709/227 |
| 8,819,617 | B1* | 8/2014 | Koenig | G06F 8/70 |
| | | | | 717/101 |
| 9,128,608 | B2* | 9/2015 | Pallakoff | G06F 3/0483 |
| 9,432,322 | B2* | 8/2016 | Tetsuhashi | G06F 3/0483 |
| 9,436,665 | B2* | 9/2016 | Pircher | G06F 17/241 |
| 9,465,803 | B2* | 10/2016 | Sik | G06F 17/241 |
| 9,628,423 | B2* | 4/2017 | Tetsuhashi | G06F 3/0483 |
| 2003/0182168 | A1* | 9/2003 | Lyons | G06Q 10/10 |
| | | | | 705/7.11 |
| 2005/0091578 | A1* | 4/2005 | Madan | G06F 17/241 |
| | | | | 715/201 |
| 2006/0005117 | A1* | 1/2006 | Yamashita | G06F 17/241 |
| | | | | 715/205 |
| 2006/0239248 | A1* | 10/2006 | Hawk | G06F 3/0483 |
| | | | | 370/352 |
| 2009/0055737 | A1* | 2/2009 | Borchardt | G06F 17/241 |
| | | | | 715/708 |
| 2009/0210814 | A1* | 8/2009 | Agrusa | G05B 23/0267 |
| | | | | 715/772 |
| 2009/0234721 | A1* | 9/2009 | Bigelow | G06Q 10/10 |
| | | | | 705/12 |
| 2009/0259937 | A1* | 10/2009 | Rohall | G06Q 10/10 |
| | | | | 715/706 |
| 2011/0016375 | A1* | 1/2011 | Ramic | G06F 17/241 |
| | | | | 715/205 |
| 2011/0029855 | A1* | 2/2011 | Morita | G06F 3/03545 |
| | | | | 715/233 |
| 2011/0072382 | A1* | 3/2011 | Caldwell | G05B 23/0216 |
| | | | | 715/772 |
| 2013/0117328 | A1* | 5/2013 | Shagrithaya | G06F 17/30867 |
| | | | | 707/802 |
| 2013/0290841 | A1* | 10/2013 | Yamazoe | G06Q 10/101 |
| | | | | 715/273 |
| 2014/0085166 | A1* | 3/2014 | Hutchinson | G09B 5/067 |
| | | | | 345/2.2 |
| 2014/0115439 | A1* | 4/2014 | Delpha | G06F 17/241 |
| | | | | 715/230 |
| 2014/0149880 | A1* | 5/2014 | Farouki | H04L 12/1822 |
| | | | | 715/748 |
| 2014/0164852 | A1* | 6/2014 | Sumiyoshi | H04N 7/155 |
| | | | | 714/57 |
| 2014/0201612 | A1* | 7/2014 | Buttner | G06F 3/0481 |
| | | | | 715/230 |
| 2014/0245123 | A1* | 8/2014 | Pircher | G06F 17/241 |
| | | | | 715/232 |
| 2014/0282077 | A1* | 9/2014 | Wilson | G06F 3/0482 |
| | | | | 715/751 |
| 2015/0146266 | A1* | 5/2015 | Nakao | H04N 1/3872 |
| | | | | 358/452 |
| 2015/0186351 | A1* | 7/2015 | Hicks | G06F 17/241 |
| | | | | 715/232 |
| 2015/0269858 | A1* | 9/2015 | Laine | G06Q 10/10 |
| | | | | 434/350 |
| 2015/0347125 | A1* | 12/2015 | High | G06F 3/0482 |
| | | | | 717/101 |

FOREIGN PATENT DOCUMENTS

| | | |
|---|---|---|
| JP | 2004-362601 A | 12/2004 |
| JP | A-2011-90486 | 5/2011 |

OTHER PUBLICATIONS

Scissors et al., Real-time Collaborative Editing Behavior in U.S. and Japanese Distributed Teams, ACM 2011, pp. 1119-1128.*

Kagifuku et al., ToGather: Linguistic Knowledge Extraction/Sharing System from Paper Documents, IEEE 2009, pp. 669-674.*

Marquardt et al., Gradual Engagement: Facilitating Information Exchange between Digital Devices as a Function of Proximity, ACM 2012, pp. 31-40.*

Kang et al., New Approaches to Help Users Get Started with Visual Interfaces: Multi-Layered Interfaces and Integrated Initial Guidance, ACM 2003, pp. 72-77.*

Andrews et al., Analyst's Workspace: An Embodied Sensemaking Environment for Large, High-Resolution Displays, IEEE 2012, pp. 123-131.*

Probst et al., Move-it: Interactive Sticky Notes Actuated by Shape Memory Alloys, ACM 2011, pp. 1393-1398.*

Widjaja et al., Discusys: Multiple User Real-time Digital Sticky-Note Affinity-Diagram Brainstorming System, Elsevier 2013, pp. 113-122.*

Widjaja et al., Discusys: Multiple User Real-time Digital Sticky-Note Affinity-Diagram Brainstorming System, ScienceDirect 2013, pp. 113-122.*

Probst et al., Move-it Sticky Notes Providing Acitve Physical Feedback through Motion, ACM 2014, pp. 29-36.*

Dec. 20, 2016 Office Action issued in Japanese Patent Application No. 2013-223182.

* cited by examiner

FIG. 8

| 810 | 820 | 830 | 840 | 850 | 860 | 870 | 880 |
|---|---|---|---|---|---|---|---|
| DISPLAY STICKY NOTE INFORMATION | POSITION | SIZE | TRANSMISSION DATE AND TIME | DATE AND TIME OF MOST RECENT ASSOCIATION | OPERATION FOR DISPLAYED STICKY NOTE INFORMATION | DATE AND TIME OF MOST RECENT OPERATION | RESULT OF DETERMINATION AS TO NEW ARRIVAL |
| TEXT OR IMAGE | (121, 33) | (300, 100) | 03/07/2013 10:12:22:33 | 03/07/2013 10:13:13:54 | | | |
| TEXT OR IMAGE | (121, 33) | (300, 100) | 03/07/2013 10:13:22:33 | | MOVEMENT | 03/07/2013 10:13:28:45 | |

800

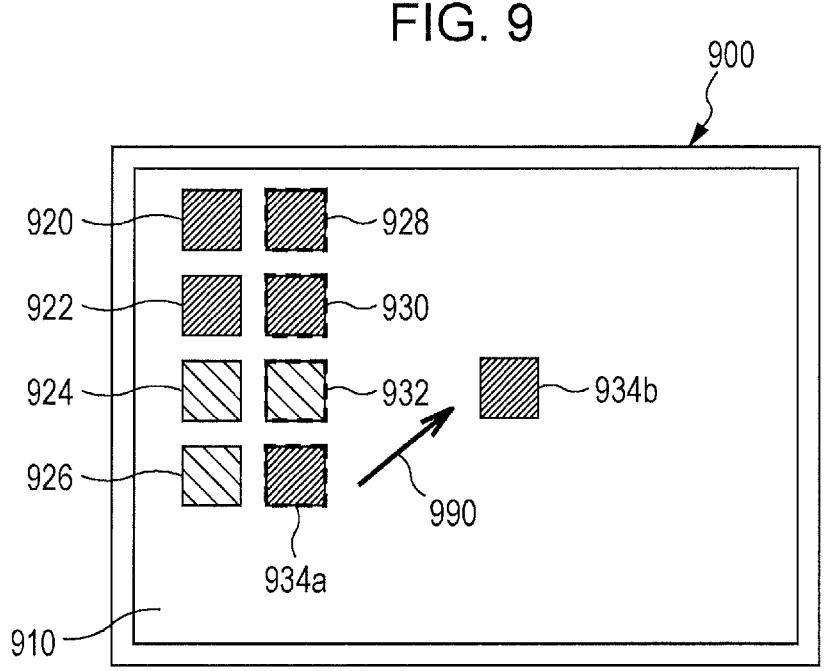

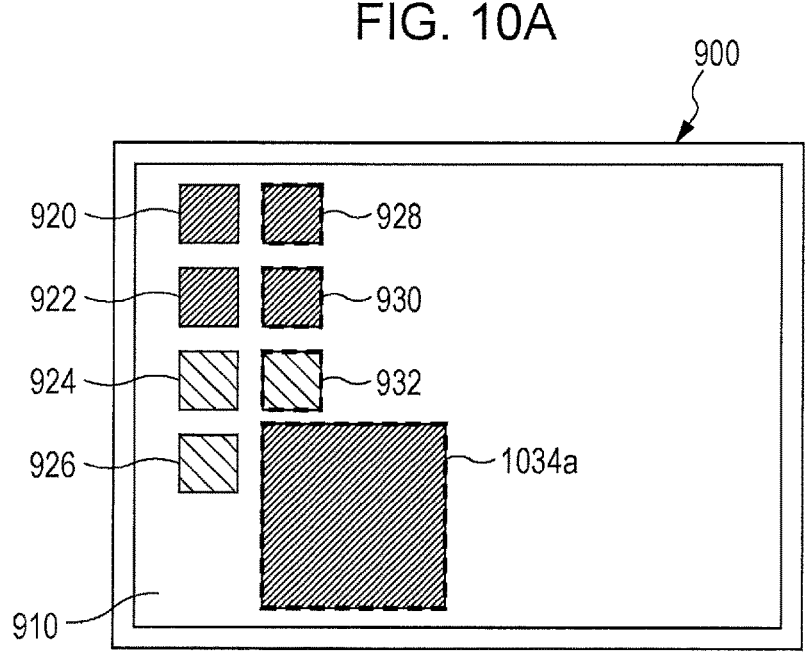
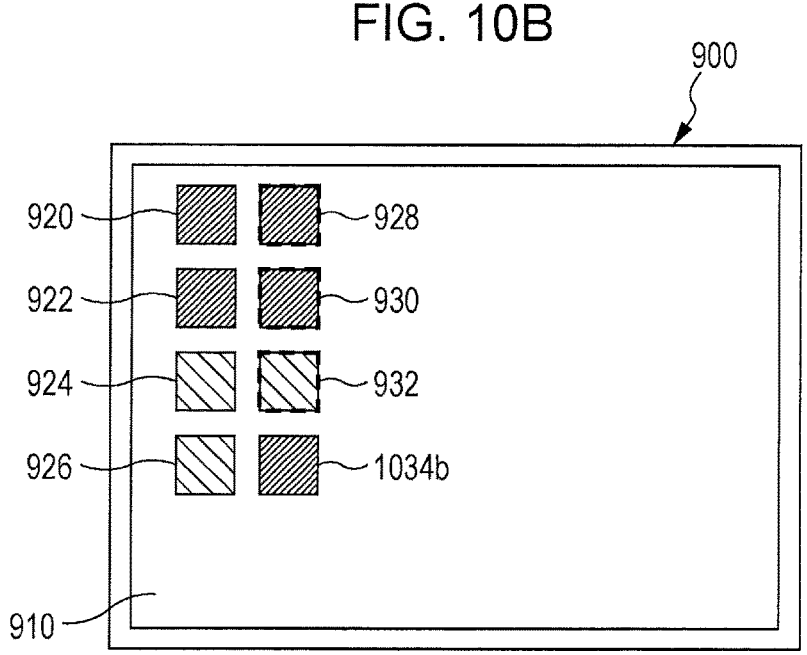

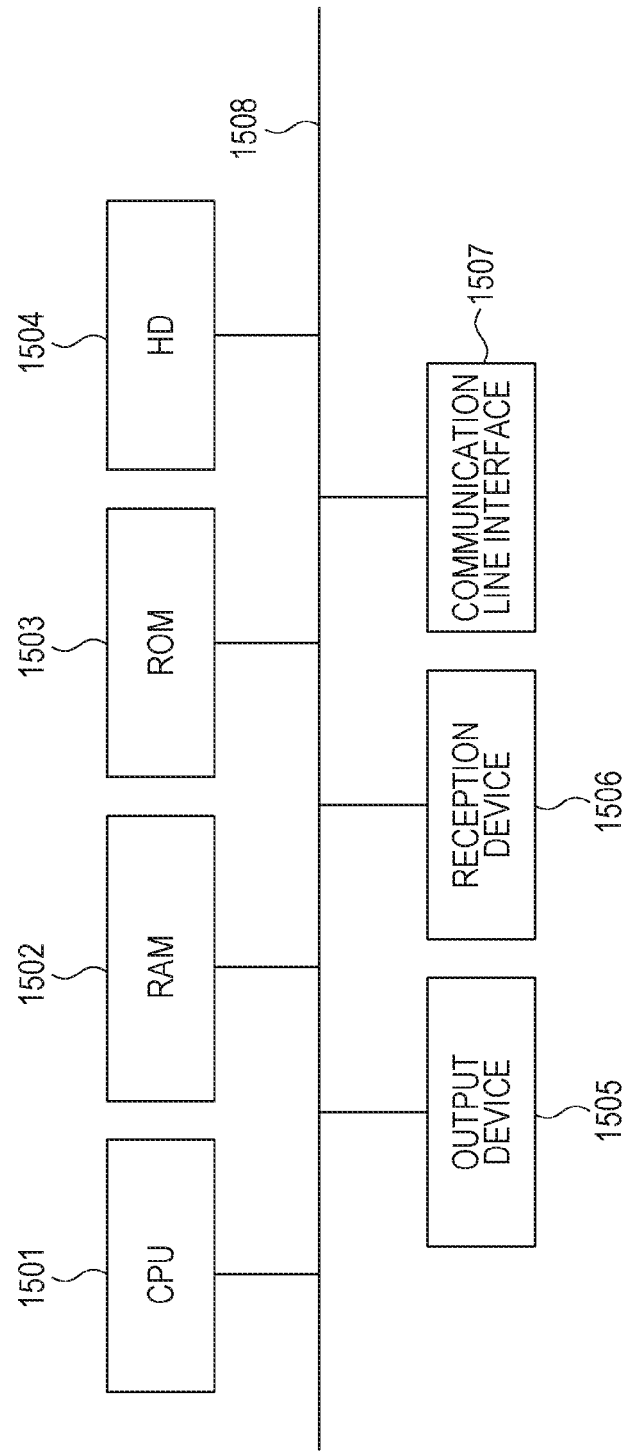

INFORMATION PROCESSING APPARATUS, INFORMATION PROCESSING METHOD, AND COMPUTER READABLE MEDIUM

CROSS-REFERENCE TO RELATED APPLICATIONS

This application is based on and claims priority under 35 USC 119 from Japanese Patent Application No. 2013-223182 filed Oct. 28, 2013.

BACKGROUND

Technical Field

The present invention relates to an information processing apparatus, an information processing method, and a computer readable medium.

SUMMARY

According to an aspect of the invention, there is provided an information processing apparatus including a reception unit, a display, a detection unit, and a changing unit. The reception unit receives sticky note information indicating a sticky note to be attached to a mount sheet. The display displays the sticky note information received by the reception unit as a newly arrived sticky note on the mount sheet. The detection unit detects that a status of the newly arrived sticky note has changed. The changing unit changes display of the newly arrived sticky note for which a change is detected by the detection unit into display as a non-newly arrived sticky note.

BRIEF DESCRIPTION OF THE DRAWINGS

Exemplary embodiments of the present invention will be described in detail based on the following figures, wherein:

FIG. 8 is an explanatory diagram illustrating an example of the data structure of a sticky note information table;

FIG. 9 is an explanatory diagram illustrating an example of a process according to the exemplary embodiment;

FIGS. 10A and 10B are explanatory diagrams illustrating an example of a process according to the exemplary embodiment;

FIG. 15 is a block diagram illustrating an example of the hardware configuration of a computer which implements the exemplary embodiment.

DETAILED DESCRIPTION

Hereinafter, an exemplary embodiment of the present invention will be described with reference to the attached drawings.

Figure 1:
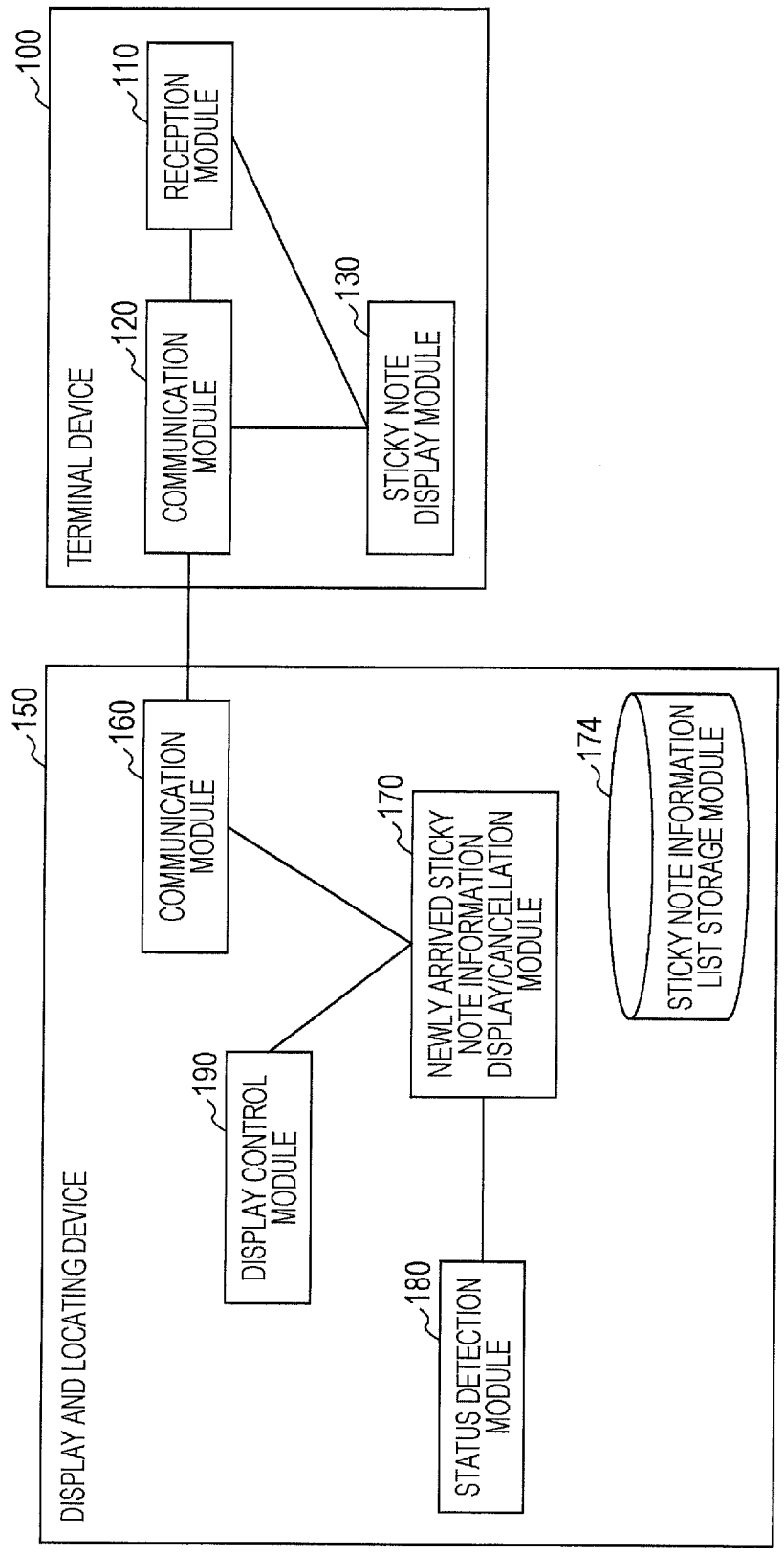
FIG. 1 is a conceptual module configuration diagram of a configuration example of an exemplary embodiment.

FIG. 1 is a conceptual module configuration diagram of a configuration example of an exemplary embodiment.

In general, the term "module" refers to a component such as software (a computer program), hardware, or the like, which may be logically separated. Therefore, a module in an exemplary embodiment refers not only to a module in a computer program but also to a module in a hardware configuration. Accordingly, through an exemplary embodiment, a computer program for causing the component to function as a module (a program for causing a computer to perform each step, a program for causing a computer to function as each unit, and a program for causing a computer to perform each function), a system, and a method are described. However, for convenience of description, the terms "store", "cause something to store", and other equivalent expressions will be used. When an exemplary embodiment relates to a computer program, the terms and expressions represent "causing a storage device to store", or "controlling a storage device to store". A module and a function may be associated on a one-to-one basis. In the actual implementation, however, one module may be implemented by one program, multiple modules may be implemented by one program, or one module may be implemented by multiple programs. Furthermore, multiple modules may be executed by one computer, or one module may be executed by multiple computers in a distributed computer environment or a parallel computer environment. Moreover, a module may include another module. In addition, hereinafter, the term "connection" may refer to logical connection (such as data transfer, instruction, and cross-reference relationship between data) as well as physical connection. The term "being predetermined" represents being set prior to target processing being performed. "Being predetermined" represents not only being set prior to processing in an exemplary embodiment but also being set even after the processing in the exemplary embodiment has started, in accordance with the condition and state at that time or in accordance with the condition and state during a period up to that time, as long as being set prior to the target processing being performed. When there are plural "predetermined values", the values may be different from one another, or two or more values (obviously, including all the values) may be the same. The term "in the case of A, B is performed" represents "a determination as to whether it is A or not is performed, and when it is determined to be A, B is performed", unless the determination of whether it is A or not is not required.

Moreover, a "system" or an "apparatus" may be implemented not only by multiple computers, hardware, apparatuses, or the like connected through a communication unit such as a network (including a one-to-one communication connection), but also by a single computer, hardware, apparatus, or the like. The terms "apparatus" and "system" are used as synonymous terms. Obviously, the term "system"

does not include social "mechanisms" (social system), which are only artificially arranged.

Furthermore, for each process in a module or for individual processes in a module performing plural processes, target information is read from a storage device and a processing result is written to the storage device after the process is performed. Therefore, the description of reading from the storage device before the process is performed or the description of writing to the storage device after the process is performed may be omitted. The storage device may be a hard disk, a random access memory (RAM), an external storage medium, a storage device using a communication line, a register within a central processing unit (CPU), or the like.

A display and locating device 150 of an information processing apparatus according to an exemplary embodiment is configured to attach sticky note information (also called an electronic sticky note, an electronic card, etc.) transmitted from a terminal device 100 to a mount sheet and display the sticky note information. As illustrated in FIG. 1, the display and locating device 150 includes a communication module 160, a newly arrived sticky note information display/cancellation module 170, a sticky note information list storage module 174, a status detection module 180, and a display control module 190. The terminal device 100, which is connected to the display and locating device 150 via a communication line, includes a reception module 110, a communication module 120, and a sticky note display module 130. Wired or wireless communication may be performed via the communication line.

The display and locating device 150 is used at a meeting (a conference, a brainstorming meeting, a review meeting, etc.) that a facilitator (in general, a single person) and two or more participants attend, using sticky note information. The participants use terminal devices (terminal devices 100 etc.) as terminals for participants to create sticky note information including an idea and the like described therein. In general, as illustrated in an example of FIG. 2, a terminal device 100*a*, a terminal device 100*b*, a terminal device 100*c*, and so on (hereinafter, representatively referred to as a terminal device 100) are examples of the terminal device 100, and there are plural terminal devices 100. The display and locating device 150 receives sticky note information from the terminal devices 100, and attaches sticky notes based on the sticky note information to the mount sheet. With the use of a common screen, which is a screen on which the display and locating device 150 displays objects, the facilitator determines or changes the positions of the sticky notes, organizes the sticky notes (that is, associating a first sticky note with a second sticky note, may be called group formation or the like), creates his/her own sticky note information, and performs other processes. Accordingly, the facilitator proceeds with the meeting. In the exemplary embodiment, participants include a facilitator.

The terminal device 100 includes, for example, a display and an input device of a touch panel type. The terminal device 100 receives an operation performed using a finger of a participant, a pen, or the like, creates sticky note information, and performs other processes. Furthermore, input using a keyboard and a mouse, audio input using a microphone, and image input using a camera, as well as input using a touch panel, are possible. Sticky note information only needs to have a data structure that is able to manage card-type information. The contents of sticky note information include, for example, text information, handwritten characters, vector data representing figures or the like, audio information, still image information such as photographs, moving image information, other types of information, and a combination of the above-mentioned information.

The reception module 110 is connected to the communication module 120 and the sticky note display module 130. The reception module 110 transmits an operation by a participant performed on a sticky note displayed on the display of the terminal device 100 by the sticky note display module 130 and information regarding sticky note information created by the participant, to the display and locating device 150 via the communication module 120 and the communication line.

The communication module 120 is connected to the reception module 110, the sticky note display module 130, and the communication module 160 of the display and locating device 150. The communication module 120 communicates with the display and locating device 150, so that information transmitted from the reception module 110 is transmitted to the display and locating device 150. The communication module 120 also receives information transmitted from the display and locating device 150, and transmits the received information to the sticky note display module 130 or a corresponding module in the terminal device 100. For example, the communication module 120 may receive screen information of the mount sheet (contents displayed by the display control module 190, or the like) from the display and locating device 150 and transmit the received screen information to the display module that performs display on the display of the terminal device 100.

The sticky note display module 130 is connected to the reception module 110 and the communication module 120. The sticky note display module 130 displays on the display of the terminal device 100 sticky note information and the like received by the reception module 110 and a mount sheet, sticky notes, and the like received by the communication module 120 and displayed by the display and locating device 150.

The communication module 160 is connected to the newly arrived sticky note information display/cancellation module 170 and the communication module 120 of the terminal device 100. The communication module 160 receives sticky note information transmitted from the terminal device 100 (sticky note information created by a participant using the terminal device 100 (including identification information, contents information, etc.). The communication module 160 may also transmit screen information of a mount sheet created by the display control module 190 (contents displayed by the display control module 190, etc.) and the like to the terminal device 100. A sticky note information table 800, which will be described later with reference to FIG. 8, corresponds to a specific example of sticky note information.

The newly arrived sticky note information display/cancellation module 170 is connected to the communication module 160, the status detection module 180, and the display control module 190. The newly arrived sticky note information display/cancellation module 170 receives sticky note information received by the communication module 160. The sticky note information mentioned here represents information (electronic data) indicating a sticky note to be attached to a mount sheet.

The newly arrived sticky note information display/cancellation module 170 instructs the display control module 190 to display received sticky note information as a newly arrived sticky note on the mount sheet. The exemplary embodiment does not adopt a method in which a newly arrived sticky note is displayed in a predetermined region on the mount sheet (newly arrived sticky note display region)

and then moved from the predetermined region. The presence of the newly arrived sticky note display region indicates that a sticky note that is present in the newly arrived sticky note display region is a newly arrived sticky note. Therefore, in this case, there is no need to display the sticky note itself as a newly arrived sticky note. In the exemplary embodiment, for example, a newly arrived sticky note is displayed at a specified position or any position on the mount sheet in a random manner, in accordance with an operation by an operator of the terminal device 100 (or a facilitator). Thus, since it is difficult to discriminate which sticky note is a newly arrived sticky note, the sticky note itself is displayed as a newly arrived sticky note in the exemplary embodiment.

The newly arrived sticky note information display/cancellation module 170 also instructs the display control module 190 to change the display of a newly arrived sticky note for which a change is detected by the status detection module 180 into display as a non-newly arrived sticky note. Obviously, when a change in the status of a newly arrived sticky note is not detected, the display status of the newly arrived sticky note is not changed (maintained in the status of the display as a newly arrived sticky note).

The status detection module 180 is connected to the newly arrived sticky note information display/cancellation module 170. The status detection module 180 detects a change in the status of a newly arrived sticky note.

For example, in the case where the time which has elapsed since the reception of a newly arrived sticky note by the newly arrived sticky note information display/cancellation module 170 (or the communication module 160) is equal to or greater than a predetermined value, the status detection module 180 may detect that the status of the newly arrived sticky note has changed. In this case, the status detection module 180 makes a determination by recording the date and time (year, month, date, second, a time unit smaller than a second, or a combination of the above-mentioned time units) at which the newly arrived sticky note was received by the newly arrived sticky note information display/cancellation module 170 (a transmission date and time field 840 of the sticky note information table 800, which will be described later) and measuring a time period (elapsed time) from the reception time to the current time.

For example, in the case where a newly arrived sticky note is moved on the mount sheet, the status detection module 180 may detect that the status of the newly arrived sticky note has changed. In this case, the status detection module 180 detects an operation on the mount sheet by an operator and determines whether or not the operation is a moving operation.

For example, in the case where a newly arrived sticky note is enlarged on the mount sheet and then caused to return to the original size, the status detection module 180 may detect that the status of the newly arrived sticky note has changed. In this case, the status detection module 180 detects an operation on the mount sheet by an operator and determines whether or not the operation is an operation for enlarging the newly arrived sticky note and then causing the newly arrived sticky note to return to the original size. Here, an "operation for enlarging a newly arrived sticky note and then causing the newly arrived sticky note to return to the original size" represents a so-called "pick-up" operation. "Picking up" a sticky note is performed in order that attention is paid to the sticky note. By picking up a sticky note, the sticky note is enlarged, so that explanation, discussion, and the like for the sticky note may be carried out. Then, after the explanation, discussion, and the like for the sticky note is terminated, (that is, "picking up" ends), the sticky note is caused to return to the original size. Prior to an operation for "enlarging a sticky note on a mount sheet", an operation for selecting the sticky note to be enlarged may be performed.

For example, in the case where a group including a newly arrived sticky note and other sticky notes is formed, the status detection module 180 may detect that the status of the newly arrived sticky note has changed. In this case, the status detection module 180 detects an operation on the mount sheet by an operator and determines whether or not the operation is an operation for forming a group. A case where "a group including a newly arrived sticky note and other sticky notes is formed" includes a case where a sticky note is moved to a region having a sticky note density equal to or greater than a predetermined value (a state in which the number of sticky notes in a predetermined unit area is equal to or greater than a predetermined value) or to the vicinity of the region, as well as a case where explicit grouping is performed.

For example, in the case where the status detection module 180 detects that the moving speed of a newly arrived sticky note based on an operation by an operator at the time of the termination of the movement has become lower than the previous moving speed or detects that the pressure of selection of a newly arrived sticky note based on an operation by an operator at the time of the termination of the movement has become higher than the previous pressure, the status detection module 180 may detect that the status of the newly arrived sticky note has changed. In this case, the status detection module 180 detects an operation as a movement on the mount sheet by an operator, measures the moving speed at the time of the termination of the movement (the moving distance per unit time) and the previous moving speed, and compares the moving speed at the time of the termination of the movement with the previous moving speed. Furthermore, the status detection module 180 includes a pressure sensor, detects an operation as a movement on the mount sheet by an operator, measures the pressure of the operation by the operator at the time of the termination of the movement (in general, the pressure of a finger of an operator on the screen of the display and locating device 150 which displays the mount sheet) and the previous pressure, and compares the pressure of the operation by the operator at the time of the termination of the movement with the previous pressure. In the case where the moving speed at the time of the termination of the movement is equal to or has become higher than the previous moving speed, display as a newly arrived sticky note is maintained. This is because the movement is likely to be merely a movement based on an intention of merely a movement or dispersion (intention of merely moving to a position different from the original position). In contrast, in the case where the moving speed at the time of the termination of the movement has become lower than the previous moving speed, the movement is likely to be a movement based on an intention of moving to a target position (clear intention of moving to a target position). Furthermore, in the case where the pressure at the time of the termination of the movement is equal to or has become lower than the previous pressure, display as a newly arrived sticky note is maintained. This is because the movement is likely to be merely a movement, as described above. In contrast, in the case where the pressure at the time of the termination of the movement has become higher than the previous pressure, the movement is likely to be a movement based on an intention of moving to a target position, as described above. The time of the termination of a movement may be a predetermined period of time (for example, 0.x seconds) in a time-backward direction from the time when the movement ends or a period of time in the time-backward direction from the time when a predetermined percentage (for example, x %) of movement in the total movement time ends.

For example, in the case where a newly arrived sticky note overlapping another sticky note on the mount sheet is moved, the status detection module 180 may not detect that the status of the newly arrived sticky note has changed. In this case, the status detection module 180 detects an operation on the mount sheet by an operator, determines whether or not sticky notes overlap, and determines whether or not a newly arrived sticky note overlapping another sticky note is moved. In the case where sticky notes overlap, a movement is likely to be a movement for causing a hidden sticky note to be visible. In this case, even though a newly arrived sticky note is moved, it is determined that the status of the newly arrived sticky note has not changed. Therefore, the display status of the moved newly arrived sticky note is maintained as it was (maintained in the status of the display as a newly arrived sticky note). The case where "sticky notes overlap" includes a case where a newly arrived sticky note is located below another sticky note and a case where a newly arrived sticky note is located above another sticky note. Furthermore, the case where "sticky notes overlap" includes a case where the sticky notes totally overlap and a case where the sticky notes partially overlap.

For example, in the case where a newly arrived sticky note is moved together with a different sticky note on the mount sheet while maintaining the positional relationship with the different sticky note, the status detection module 180 may not detect that the status of the newly arrived sticky note has changed. In this case, the status detection module 180 detects an operation on the mount sheet by an operator, selects plural sticky notes including a newly arrived sticky note, and determines whether or not a movement is an operation for moving the plural sticky notes while maintaining the positional relationship among them. This is because moving plural sticky notes while maintaining the positional relationship among them is likely to be merely a movement, as described above. In this case, even though a newly arrived sticky note is moved, it is determined that the status of the newly arrived sticky note has not changed. Therefore, the display status of the moved newly arrived sticky note is maintained as it was (maintained in the status of the display as a newly arrived sticky note).

Furthermore, in the case where a combination of the above-mentioned conditions (logical operations, such as AND, OR, and NOT) are satisfied, the status detection module 180 may detect that the status of a newly arrived sticky note has changed or may not detect that the status of a newly arrived sticky note has changed.

The sticky note information list storage module 174 stores, for example, the sticky note information table 800. FIG. 8 is an explanatory diagram illustrating an example of the data structure of the sticky note information table 800. The sticky note information table 800 includes a display sticky note information field 810, a position field 820, a size field 830, the transmission date and time field 840, a date and time field 850 for the most recent association, an operation field 860 for displayed sticky note information, a date and time field 870 for the most recent operation, and a result field 880 for determination as to new arrival. The display sticky note information field 810 stores sticky note information. For example, sticky note information may be text as character data, image data such as photographs, or the like. The position field 820 stores a position where a sticky note is displayed. The size field 830 stores the display size of a sticky note. For example, in the case where a sticky note to be displayed is a rectangle, vertical and horizontal dimensions of the sticky note are stored. The transmission date and time field 840 stores the date and time when a sticky note was transmitted (or received). The date and time field 850 stores the date and time when the most recent association with a group was performed. The operation field 860 stores an operation for a displayed sticky note (for example, movement, "picking up" described above, deletion, or the like). The date and time field 870 stores the date and time when the most recent operation was performed. The result field 880 stores the result of a determination as to whether or not a sticky note is a newly arrived sticky note.

The reception module 110 of the terminal device 100 creates the sticky note information table 800 in accordance with an operation by a participant, and the created sticky note information table 800 is transmitted to the display and locating device 150 and is stored in the sticky note information list storage module 174 via the communication module 160. Then, writing to and reading from the sticky note information table 800 is performed by the communication module 160, the newly arrived sticky note information display/cancellation module 170, the status detection module 180, and the display control module 190.

The display control module 190 is connected to the newly arrived sticky note information display/cancellation module 170. The display control module 190 displays, on a common screen, a mount sheet (a blank sheet of paper as the background, x and y axes for indicating the coordinate system, a chart used for strengths, weaknesses, opportunities, and threats (SWOT) analysis, and other patterns) and sticky note information attached to the mount sheet, and displays a sticky note in accordance with an instruction from the newly arrived sticky note information display/cancellation module 170. For example, sticky note information is displayed as a newly arrived sticky note on the mount sheet or display as a newly arrived sticky note is changed into display as a non-newly arrived sticky note. Display as a newly arrived sticky note is display for indicating that a new sticky note appears on the mount sheet and only needs to be in a form (including a shape, pattern, color, a combination of these elements, or a dynamic change of one or a combination of these elements) different from display as a non-newly arrived sticky note. For example, a newly arrived sticky note may be displayed in an oval shape, may be displayed surrounded by a thick dotted line, may be displayed in red color, may be displayed flashed (including animation), or may be displayed in other forms. Display as a non-newly arrived sticky note is display indicating that a sticky note is not a newly arrived sticky note and displayed in a general manner. For example, a non-newly arrived sticky note may be displayed in a rectangular shape, may be displayed surrounded by a solid line, or may be displayed in other forms. Display as a newly arrived sticky note and display as a non-newly arrived sticky note may be in plural forms as long as the distinction between display as a newly arrived sticky note and display as a non-newly arrived sticky note may be clear.

Figure 2:
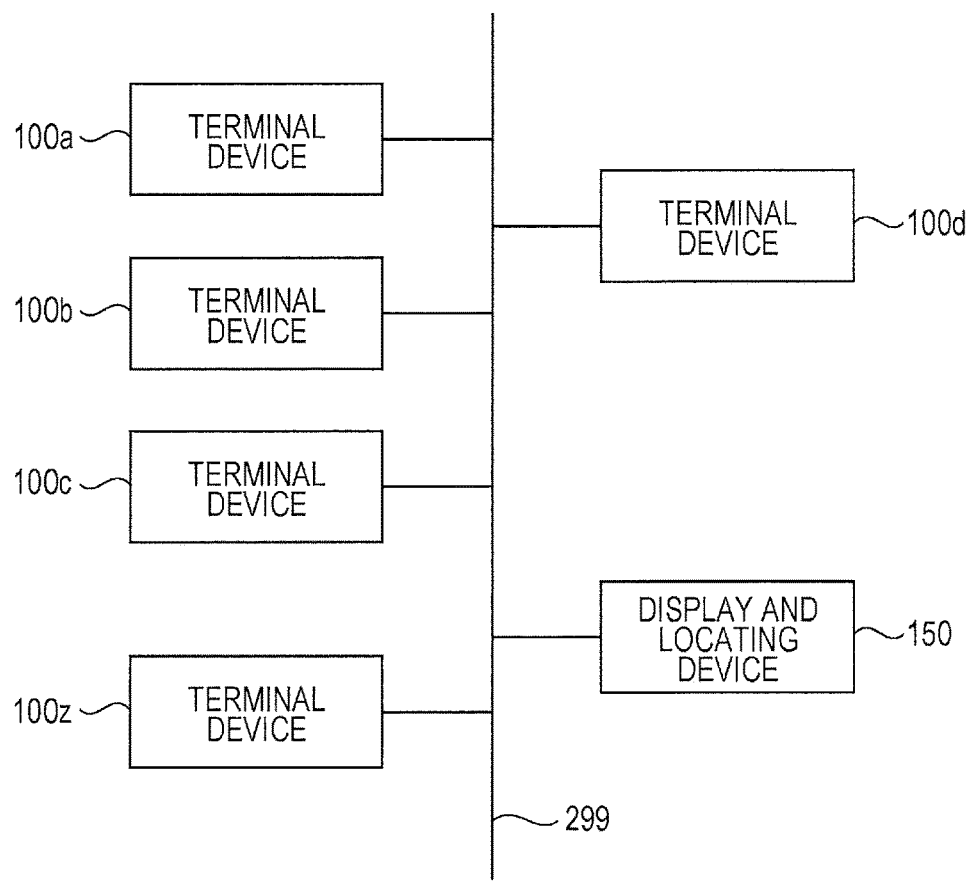
FIG. 2 is an explanatory diagram illustrating an example of a system configuration for implementing the exemplary embodiment.

FIG. 2 is an explanatory diagram illustrating an example of a system configuration for implementing the exemplary embodiment. The terminal device 100a, the terminal device 100b, the terminal device 100c, the terminal device 100d, the terminal device 100z, and so on, and the display and locating device 150 are connected to one another via a communication line 299. All the devices are not necessarily located in a room (conference room or the like). In general, however, the terminal device 100*a* and so on which are used by participants and the display and locating device 150 which is used by a facilitator are located in the same room. Wired or wireless communication may be performed via the communication line 299. Further, in general, each participant owns a corresponding terminal device 100, and the display and locating device 150 is generally operated by a facilitator.

FIG. 3 is an explanatory diagram illustrating an example of a conference room or the like in the exemplary embodiment.

Figure 3A:
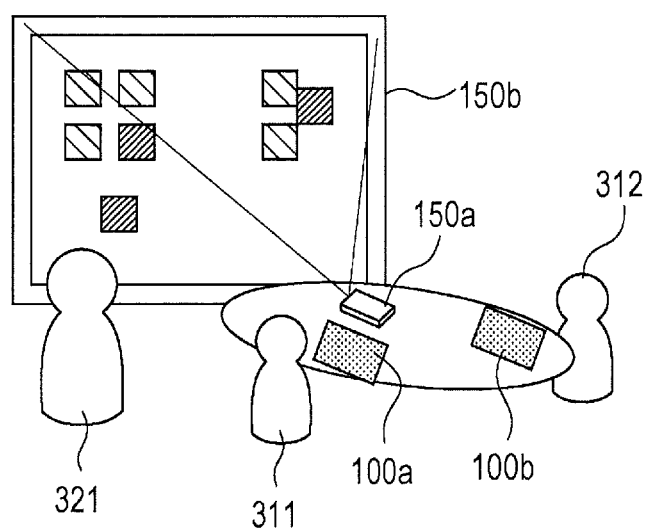
FIGS. 3A and 3B are explanatory diagrams illustrating an example of a conference room or the like in the exemplary embodiment.
Figure 3B:
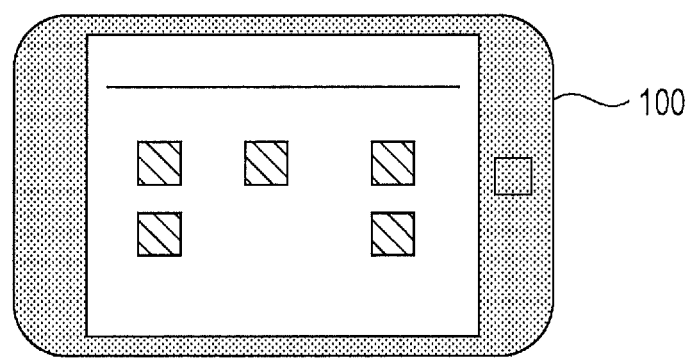

As illustrated in an example of FIG. 3A, participants 311 and 312 and a facilitator 321 are located in a conference room or the like. The participant 311 uses the terminal device 100*a*, and the participant 312 uses the terminal device 100*b*. In general, a terminal device (terminal device 100*a* etc.) is given to each participant, and as illustrated in an example of FIG. 3B, the terminal device 100 has a size equivalent to a notebook (for example, A4 paper size, B5 paper size, 7 to 10 inches, etc.), is a tablet-type terminal, and is operated using a finger, a pen, or the like. A participant creates sticky note information including text data, handwritten characters, figures, or the like described therein. The terminal device is not necessarily a tablet-type terminal. The terminal device may be a personal computer (PC) or the like including a keyboard, a mouse, and the like.

A display and locating device 150*a* is a projector which displays a mount sheet. The display and locating device 150*a* may include a large-size screen (for example, 80 inches or the like). A display and locating device 150*b* is an electronic white board. The display and locating device 150*b* detects a movement of a finger, a pen, or the like of the facilitator 321, and receives an operation, such as attaching a sticky note to the mount sheet, moving a sticky note, "picking up" described above, association (grouping) of sticky notes, and the like. For example, the display and locating device 150*b* is provided with a pen. The display and locating device 150*b* receives an operation for the mount sheet and a sticky note, by detecting that the pen has been removed from a predetermined pen holder (detecting that the facilitator 321 has lifted up the pen for an operation) and detecting the position of the tip of the pen (detecting that the tip of the pen has touched the display and locating device 150*b*, or the like). For example, by providing a sensor at the pen holder (a sensor whose switch is turned on and off based on the gravity of the pen, or the like), a detection may be made which pen is being used from among plural pens (a black pen, a red pen, a blue pen, etc.). Furthermore, the entire display screen of the display and locating device 150*b* may be a touch sensor, and the position of the display screen touched and the pressure at the touched position may be detected.

Figure 4:
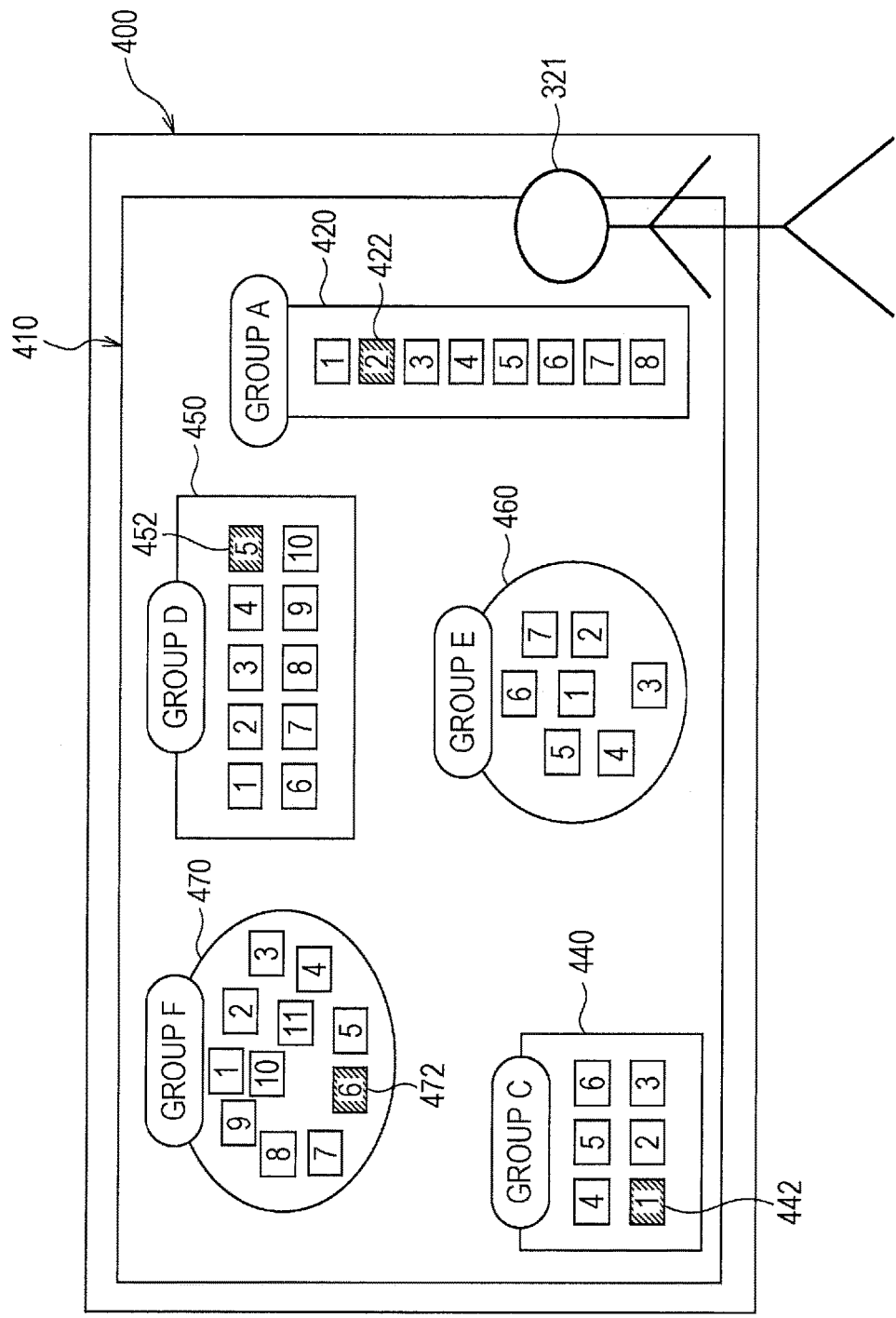
FIG. 4 is an explanatory diagram illustrating an example of display of a common screen in the exemplary embodiment.

FIG. 4 is an explanatory diagram illustrating an example of display of a common screen 400 in the exemplary embodiment. The common screen 400 is displayed on the display and locating device 150*b* illustrated in the example of FIG. 3A.

The common screen 400 includes a mount sheet region 410. Within the mount sheet region 410, general sticky notes (in FIG. 4, small rectangles) are displayed. In addition to the sticky notes, a group region A420, a group region C440, a group region D450, a group region E460, and a group region F470 in which the sticky notes are associated with one another are displayed within the mount sheet region 410. In accordance with an operation by the facilitator 321, who is one of the participants, the sticky notes are moved within the mount sheet region 410 (for example, from a group to a different group).

As a method for forming a group, by detecting an explicit operation by the facilitator for writing the frame of the group region A420, sticky notes within the frame may be grouped into a group. Furthermore, by detecting a region which is generated by a movement of a sticky note and which has a sticky note density equal to or higher than a predetermined value, sticky notes within the region may be grouped into a group.

Figure 5:
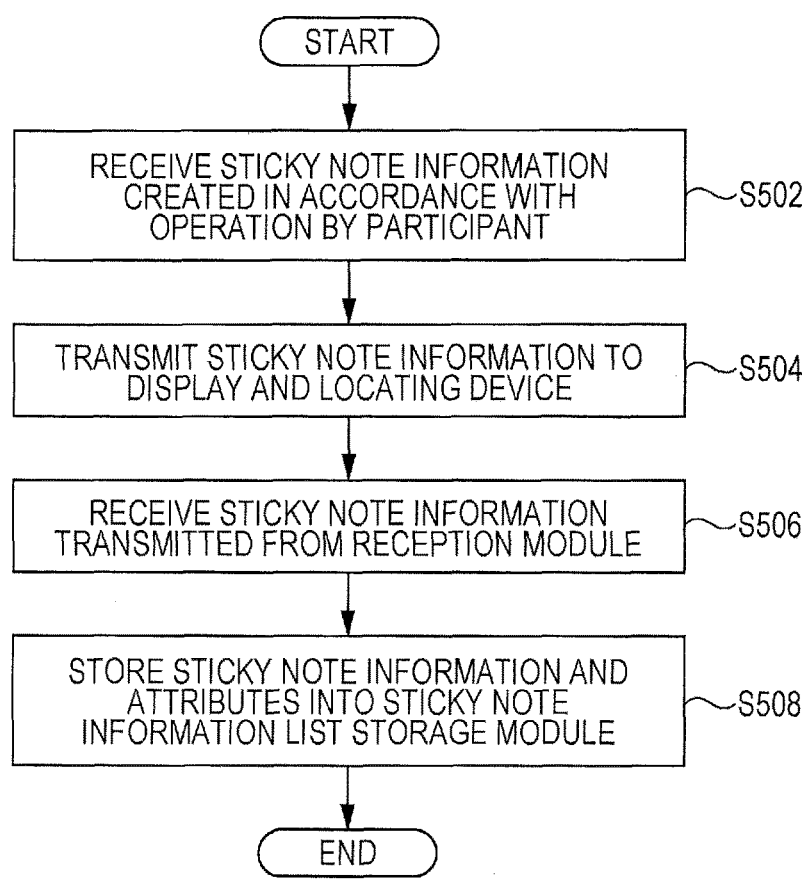
FIG. 5 is a flowchart illustrating an example of a process according to the exemplary embodiment.

FIG. 5 is a flowchart illustrating an example of a process according to the exemplary embodiment.

In step S502, the reception module 110 receives sticky note information created by an operation by a participant.

In step S504, the communication module 120 transmits the sticky note information to the display and locating device 150.

In step S506, the communication module 160 receives the sticky note information transmitted from the reception module 110.

In step S508, the newly arrived sticky note information display/cancellation module 170 stores the sticky note information and attributes (a creator identification (ID) representing a creator, a creation date and time, etc.) in the sticky note information list storage module 174.

Figure 6:
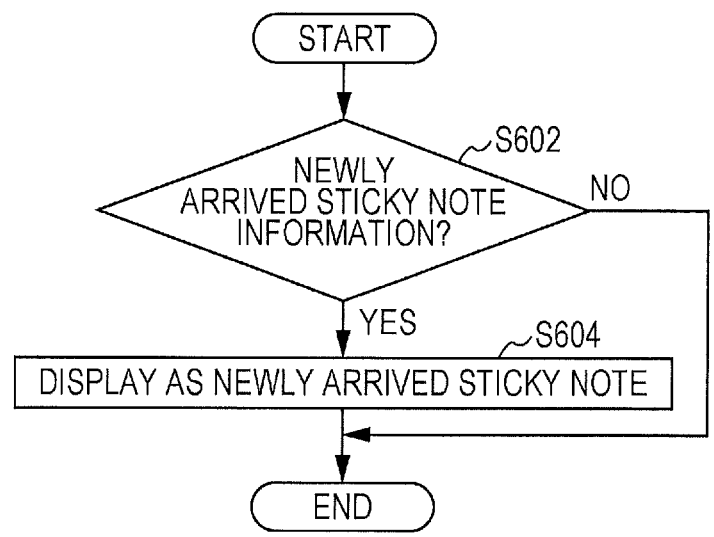
FIG. 6 is a flowchart illustrating an example of a process according to the exemplary embodiment.

FIG. 6 is a flowchart illustrating an example of a process (an example of a process for displaying a newly arrived sticky note) according to the exemplary embodiment.

In step S602, the newly arrived sticky note information display/cancellation module 170 determines whether or not target sticky note information is newly arrived sticky note information. In the case where the target sticky note information is newly arrived sticky note information, the process proceeds to step S604. In the case where the target sticky note information is not newly arrived sticky note information, the process is terminated. For example, the newly arrived sticky note information display/cancellation module 170 may determine whether or not target sticky note information is sticky note information newly added to the sticky note information table 800 in the sticky note information list storage module 174.

In step S604, the display control module 190 displays the sticky note as a newly arrived sticky note, in accordance with an instruction of the newly arrived sticky note information display/cancellation module 170.

Figure 7:
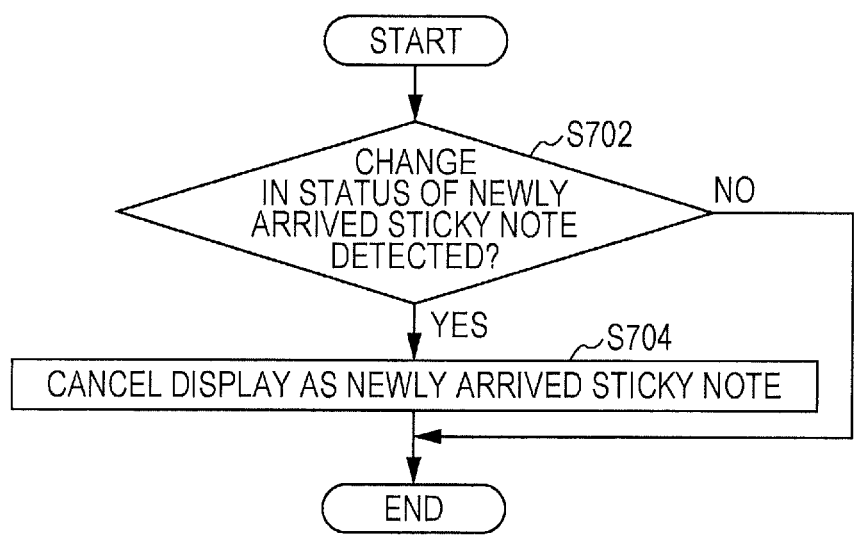
FIG. 7 is a flowchart illustrating an example of a process according to the exemplary embodiment.

FIG. 7 is a flowchart illustrating an example of a process (an example of a process for canceling display as a newly arrived sticky note) according to the exemplary embodiment.

In step S702, the newly arrived sticky note information display/cancellation module 170 determines whether or not a change in the status of a newly arrived sticky note has been detected by the status detection module 180. In the case where a change in the status of a newly arrived sticky note has been detected, the process proceeds to step S704. In the case where a change in the status of a newly arrived sticky note has not been detected, the process is terminated.

In step S704, the display control module 190 cancels display of the sticky note as a newly arrived sticky note, in accordance with an instruction of the newly arrived sticky note information display/cancellation module 170.

FIG. 9 is an explanatory diagram illustrating an example of a process (an example of a process for moving a sticky note) according to the exemplary embodiment. A mount sheet 910 is displayed on a common screen 900. A sticky note (non-newly arrived) 920, a sticky note (non-newly arrived) 922, a sticky note (non-newly arrived) 924, a sticky note (non-newly arrived) 926, a sticky note (newly arrived) 928, a sticky note (newly arrived) 930, a sticky note (newly arrived) 932, and a sticky note (newly arrived) 934a are displayed on the mount sheet 910. The sticky notes (newly-arrived) 928 and so on are each displayed surrounded by a thick dotted line, in a display form for a newly arrived sticky note. Here, the sticky note (newly arrived) 934a is moved to a position of a sticky note (non-newly arrived) 934b, in accordance with a moving operation 990 by the facilitator. The status detection module 180 detects that the sticky note (newly arrived) 934a is moved on the mount sheet 910, and determines that the status of the sticky note (newly arrived) 934a has changed. The newly arrived sticky note information display/cancellation module 170 changes the display status of the sticky note (newly arrived) 934a from display as a newly arrived sticky note into display as a non-newly arrived sticky note (display not surrounded by a thick dotted line) for the sticky note (non-newly arrived) 934b. In the case where a movement is not merely a movement but a movement over a distance equal to or greater than a predetermined value, a change in the status of a sticky note may be detected.

FIG. 10 is an explanatory diagram illustrating an example of a process (an example of a process for picking up a sticky note) according to the exemplary embodiment. In the state of the sticky note (newly arrived) 934a illustrated in the example of FIG. 9, the sticky note (newly arrived) 934a is selected in accordance with a pick-up operation by the facilitator, and is enlarged. As illustrated in FIG. 10A, a result obtained by enlarging the sticky note (newly arrived) 934a is illustrated as a sticky note (newly arrived) 1034a. After picking up of the sticky note ends, the sticky note in the enlarged state is caused to return to the original size, and the display as a newly arrived sticky note is changed into the display as a non-newly arrived sticky note (display not surrounded by a thick dotted line) for a sticky note (non-newly arrived) 1034b illustrated in an example of FIG. 10B.

Figure 11:
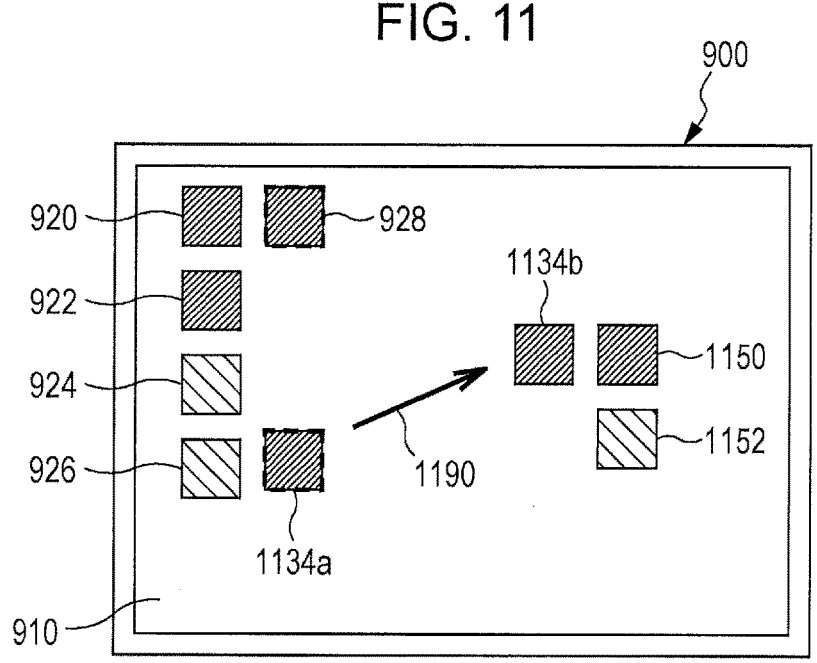
FIG. 11 is an explanatory diagram illustrating an example of a process according to the exemplary embodiment.

FIG. 11 is an explanatory diagram illustrating an example of a process (an example A of a grouping process) according to the exemplary embodiment. A sticky note (newly arrived) 1134a is moved to a position of a sticky note (non-newly arrived) 1134b, in accordance with a moving operation 1190 by the facilitator. The status detection module 180 detects that the sticky note (newly arrived) 1134a is moved on the mount sheet 910, and detects that the sticky note (newly arrived) 1134a has moved to a position in the vicinity of a sticky note (non-newly arrived) 1150 and a sticky note (non-newly arrived) 1152. Since the position to which the sticky note (newly arrived) 1134a has been moved is in the vicinity of the sticky note (non-newly arrived) 1150 and the sticky note (non-newly arrived) 1152 and thus the three sticky notes (the sticky note (non-newly arrived) 1134b, the sticky note (non-newly arrived) 1150, and the sticky note (non-newly arrived) 1152) are present within a region, the sticky note density of the region has become equal to or higher than a predetermined value. Therefore, it is determined that the movement is an operation for forming a group, and a change in the status of the sticky note (newly arrived) 1134a is detected. At the position to which the sticky note (newly arrived) 1134a has been moved, the sticky note (non-newly arrived) 1134b is displayed as a non-newly arrived sticky note.

Figure 12:
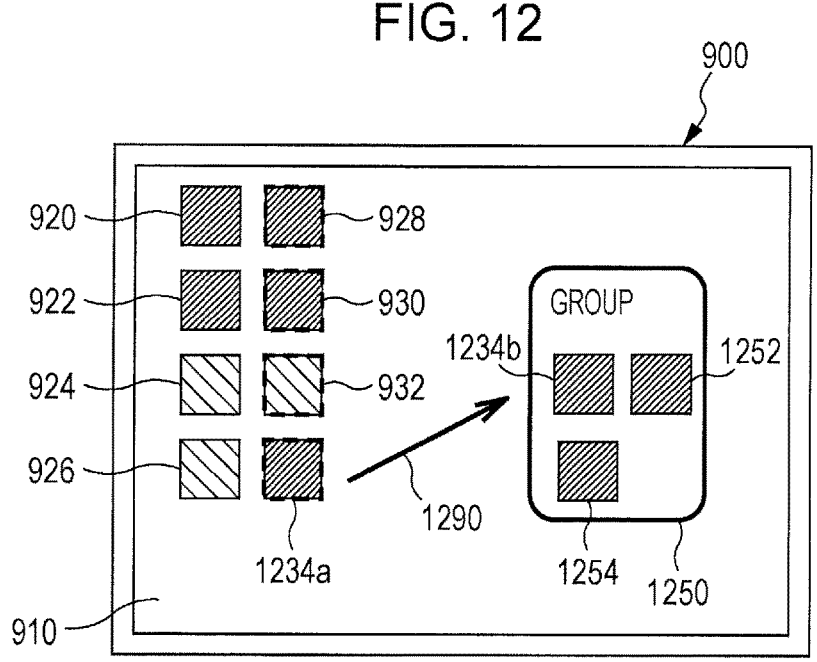
FIG. 12 is an explanatory diagram illustrating an example of a process according to the exemplary embodiment.

FIG. 12 is an explanatory diagram illustrating an example of a process (an example B of a grouping process) according to the exemplary embodiment. In this example, there is a group including a sticky note (non-newly arrived) 1252 and a sticky note (non-newly arrived) 1254 as members. A sticky note (newly arrived) 1234a is moved to the position of a sticky note (non-newly arrived) 1234b within the region of the group, in accordance with a grouping operation 1290 by the facilitator. The status detection module 180 detects that the sticky note (newly arrived) 1234a is moved on the mount sheet 910 and detects that the position to which the sticky note (newly arrived) 1234a has been moved is within the group region. Therefore, since a group including the sticky note (non-newly arrived) 1234b and other sticky notes (the sticky note (non-newly arrived) 1252 and the sticky note (non-newly arrived) 1254)) is formed, a change in the status of the sticky note (newly arrived) 1234a is detected. At the position to which the sticky note (newly arrived) 1234a has been moved, the sticky note (non-newly arrived) 1234b is displayed as a non-newly arrived sticky note.

Figure 13:
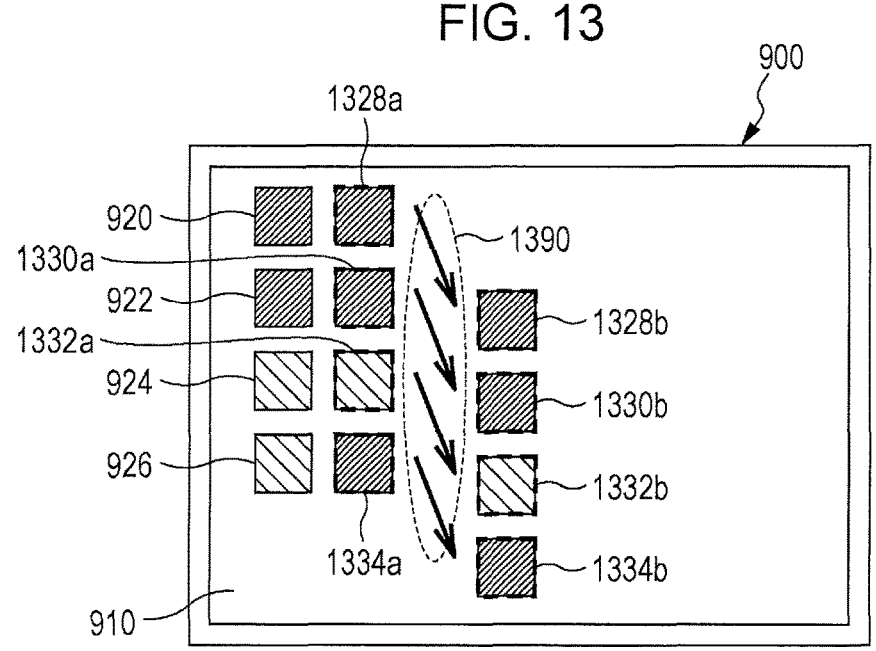
FIG. 13 is an explanatory diagram illustrating an example of a process according to the exemplary embodiment.

FIG. 13 is an explanatory diagram illustrating an example of a process (an example of a process for moving plural sticky notes) according to the exemplary embodiment. A sticky note (newly arrived) 1328a, a sticky note (newly arrived) 1330a, a sticky note (newly arrived) 1332a, and a sticky note (newly arrived) 1334a are selected and moved to positions of a sticky note (newly arrived) 1328b, a sticky note (newly arrived) 1330b, a sticky note (newly arrived) 1332b, and a sticky note (newly arrived) 1334b, respectively, in accordance with a parallel translation operation 1390 by the facilitator. The status detection module 180 detects that the sticky note (newly arrived) 1328a is moved on the mount sheet 910. However, since the sticky note (newly arrived) 1328a is moved together with other sticky notes (sticky note (newly arrived) 1330a and so on) while maintaining the positional relationship with the other sticky notes (sticky note (newly arrived) 133a and so on), a change in the status of the newly arrived sticky note is not detected. As processing for moving a sticky note while maintaining the positional relationship with plural sticky notes, after the plural sticky notes are selected, an operation for moving the most recently selected sticky note is detected, and the other sticky notes are subjected to parallel translation while maintaining the positional relationship with the most recently selected sticky note.

Furthermore, in the case where sticky notes overlap, in order to display a portion in which the contents of a sticky note are hidden by overlapping, a sticky note may be moved in accordance with an operation by the facilitator. In the case where an overlapping sticky note is moved, even if the moved sticky note is a newly arrived sticky note, a change in the status of the newly arrived sticky note is not detected.

Figure 14:
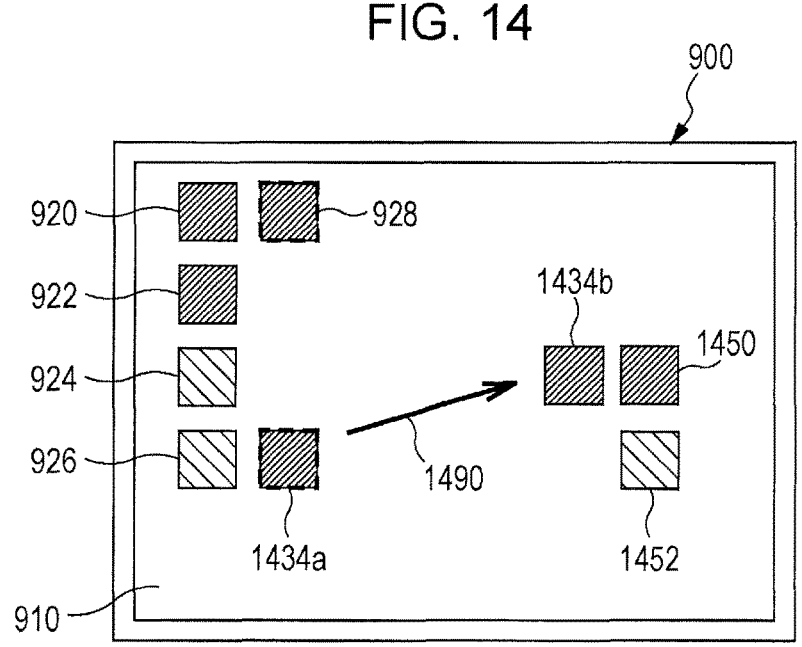
FIG. 14 is an explanatory diagram illustrating an example of a process according to the exemplary embodiment.

FIG. 14 is an explanatory diagram illustrating an example of a process (an example of a process for moving a sticky note) according to the exemplary embodiment. A sticky note (newly arrived) 1434a is selected and is moved to the position of a sticky note (non-newly arrived) 1434b, in accordance with a moving operation 1490 by the facilitator. In this case, in the case where the moving speed at the time of the termination of the movement of the moving operation 1490 has become lower than the previous moving speed, a change in the status of the sticky note (newly arrived) 1434a is detected. Further, in the case where the pressure at the time of the termination of the movement of the moving operation 1490 has become higher than the previous pressure, a change in the status of the sticky note (newly arrived) 1434a is detected. At the position to which the sticky note (newly arrived) 1434a has been moved, the sticky note (non-newly arrived) 1434b is displayed as a non-newly arrived sticky note. Further, in the case where the moving speed at the time of the termination of the movement of the moving operation 1490 is equal to or has become higher than the previous moving speed, a change in the status of the sticky note (newly arrived) 1434a is not detected. In the case where the pressure at the time of the termination of the movement of the moving operation 1490 is equal to or has become lower than the previous pressure, a change in the status of the sticky note (newly arrived) 1434a is not detected.

The hardware configuration of a computer which executes a program according to the exemplary embodiment is a general computer, as illustrated in FIG. 15, and more specifically, a computer which may serve as a personal computer, a server, or the like. That is, as a specific example, the computer includes a CPU 1501 as a processing unit (arithmetic operation unit), and a RAM 1502, a read-only memory (ROM) 1503, and an HD 1504 as storage devices. The HD 1504 may be, for example, a hard disk. The computer includes the CPU 1501 that executes a program including the reception module 110, the communication module 120, the sticky note display module 130, the communication module 160, the newly arrived sticky note information display/cancellation module 170, the status detection module 180, the display control module 190, and the like; the RAM 1502 that stores the program and data; the ROM 1503 that stores a program for starting the computer, and the like; the HD 1504 serving as an auxiliary storage device (may be a flash memory or the like); a reception device 1506 that receives data in accordance with an operation by a user for a keyboard, a mouse, a touch panel, or the like; an output device 1505, such as a cathode ray tube (CRT), a liquid crystal display, or the like, a communication line interface 1507 for connection with a communication network such as a network interface card; and a bus 1508 that connects the above-mentioned components and that allows data transfer among the above-mentioned components. Multiple computers described above may be connected with one another over a network.

An exemplary embodiment of the foregoing exemplary embodiments that concerns a computer program may be implemented by causing a system having the above-mentioned hardware configuration to read a computer program, which is software, and allowing the software and hardware resources to cooperate together.

The hardware configuration illustrated in FIG. 15 is merely a configuration example. The exemplary embodiments are not limited to the configuration illustrated in FIG. 15 as long as the modules explained in the exemplary embodiments may be executed. For example, some modules may be configured to be dedicated hardware (for example, an application specific integrated circuit (ASIC)), some modules may be located in an external system that may be connected via a communication line, or plural systems illustrated in FIG. 15 may be connected to one another via a communication line so that they cooperate together. Furthermore, in particular, the modules may be incorporated in a home information appliance, a copying machine, a facsimile machine, a scanner, a printer, a multifunction machine (image processing apparatus having two or more of functions of a scanner, a printer, a copying machine, a facsimile machine, and the like), or the like, as well as a personal computer.

In the foregoing exemplary embodiment, an example in which anyone is able to perform an operation for moving a newly arrived sticky note or the like has been explained. However, in the case where the same person as who has created a newly arrived sticky note performs an operation for moving the newly arrived sticky note or the like, a change in the status of the newly arrived sticky note may not be detected. For example, in the case where the same terminal device 100 as that transmits a newly arrived sticky note transmits an operation for moving the newly arrived sticky note, the newly arrived sticky note is kept displayed as a newly arrived sticky note. In the case where a creator ID as an attribute of a newly arrived sticky note and an operator ID of a person who has performed a moving operation are acquired and the creator ID is different from the operator ID, a change in the status of the newly arrived sticky note is detected, and the display as a newly arrived sticky note is changed into display as a non-newly arrived sticky note. In contrast, in the case where the creator ID is equal to the operator ID, a change in the status of the newly arrived sticky note is not detected, and the newly arrived sticky note is kept displayed as a newly arrived sticky note. As processing for acquiring an operator ID of a person who has performed a moving operation, for example, when a region of a name displayed on the touch panel is touched, it may be determined that the person represented by the name (participant ID) will perform the subsequent operation. Alternatively, in the case where each participant owns an IC card which stores a corresponding participant ID and which is able to implement short-range communication and the display and locating device 150 includes a reading device which reads such an IC card, it may be determined that a participant who is located at a position closest to the display and locating device 150 (for example, a participant of a participant ID whose reading signal is the strongest) is the person who is performing an operation.

Further, in the case where, among conditions for canceling display as a newly arrived sticky note, a moving operation or an operation for forming a group is performed and then an operation opposite the performed operation is performed, the display status of a sticky note for which display as a non-newly arrived sticky note is performed may be changed again into the display as a newly arrived sticky note.

Further, the status detection module 180 may combine two or more detection methods described above. For example, in the case where an operator of the terminal device 100 who created a sticky note is able to designate the position of the sticky note on the display and locating device 150, the sticky note may be originally added to a position desired by the operator. In such a case, cancelation of new arrival according to the elapsed time may be always made effective, and a different detection method may also be adopted. That is, in the case where the time which has elapsed since the reception of a sticky note is equal to or greater than a predetermined value or in the case where a change in the status of a newly arrived sticky note is detected by a different detection method (movement of a sticky note on the mount sheet is detected), display as a newly arrived sticky note may be changed into display as a non-newly arrived sticky note.

Further, in the case where display as a newly arrived sticky note is changed into display as a non-newly arrived sticky note and then the status detection module 180 detects that the contents of a sticky note have changed, in the case where the sticky note is removed from a group (in special, a sticky note for which display as a newly arrived sticky note is changed into display as a non-newly arrived sticky note because of formation of a group, is removed from the group), or in the case where the sticky note is caused to overlap a different sticky note, a change in the status of the sticky note into a status as a newly arrived sticky note is detected. In the case where the status detection module 180 detects that the status of a sticky note is changed into a status as a newly arrived sticky note, the newly arrived sticky note information display/cancellation module 170 may cause the status of the sticky note as a non-newly arrived sticky note to return to display as a newly arrived sticky note. In the case where a change in the contents of a sticky note is not detected, the status detection module 180 may provide constraints described below. In the case where a sticky note is removed from a group or the sticky note is caused to overlap a different sticky note within a predetermined period of time from the first display as a newly arrived sticky note, a change of the status of the sticky note into a status as a newly arrived sticky note may be detected. After the predetermined period of time, even if the sticky note is removed from the group or the like, a change of the status of the sticky note into the status as a newly arrived sticky note is not detected.

The programs described above may be stored in a recording medium and provided or may be supplied through communication. In this case, for example, the program described above may be considered as an invention of "a computer-readable recording medium which records a program".

"A computer-readable recording medium which records a program" represents a computer-readable recording medium which records a program to be used for installation, execution, and distribution of the program.

A recording medium is, for example, a digital versatile disc (DVD), including "a DVD-R, a DVD-RW, a DVD-RAM, etc.", which are the standards set by a DVD forum, and "a DVD+R, a DVD+RW, etc.", which are the standards set by a DVD+RW, a compact disc (CD), including a read-only memory (CD-ROM), a CD recordable (CD-R), a CD rewritable (CD-RW), etc., a Blu-Ray™ Disc, a magneto-optical disk (MO), a flexible disk (FD), a magnetic tape, a hard disk, a ROM, an electrically erasable programmable read-only memory (EEPROM™), a flash memory, a RAM, a secure digital (SD) memory card, or the like.

The program described above or part of the program may be recorded in the above recording medium, to be stored and distributed. Furthermore, the program may be transmitted through communication, for example, a wired network or a wireless communication network used for a local area network (LAN), a metropolitan area network (MAN), a wide area network (WAN), the Internet, an intranet, an extranet, or the like, or a transmission medium of a combination of the above networks. Alternatively, the program or a part of the program may be delivered by carrier waves.

The above-mentioned program may be part of another program or may be recorded in a recording medium along with a different program. Further, the program may be divided and recorded into multiple recording media. The program may be stored in any format, such as compression or encryption, as long as the program may be reproduced.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to act as:
a first reception unit that receives sticky note information indicating a sticky note to be attached to a mount sheet;
a display controller that controls a display to display the sticky note information received by the first reception unit in a form of a newly arrived sticky note on the mount sheet, the form of the newly arrived sticky note and a form of a non-newly arrived sticky note being different from each other in at least one of shape, pattern and color of the sticky note; and
a second reception unit that receives an instruction to move a position of the newly arrived sticky note on the mount sheet, wherein
the processor is further configured to act as a detection unit that detects a moving speed of the newly arrived sticky note or a pressure of selection of the newly arrived sticky note based on an operation by an operator, and
when the moving speed at a time of termination of a movement has become lower than a previous moving speed or when the pressure at a time of termination of a movement has become higher than a previous pressure, the display controller controls the display to display the newly arrived sticky note in the form of a non-newly arrived sticky note.

2. The information processing apparatus according to claim 1,
wherein when a time which has elapsed since reception of the newly arrived sticky note by the first reception unit is equal to or greater than a predetermined value, the display controller controls the display to display the newly arrived sticky note in the form of a non-newly arrived sticky note.

3. The information processing apparatus according to claim 2,
wherein after of the newly arrived sticky note is displayed in the form of a non-newly arrived sticky note, and (i) when a change in contents of the non-newly arrived sticky note is detected, (ii) when the non-newly arrived sticky note is removed from a group, or (iii) when the non-newly arrived sticky note is caused to overlap a different sticky note, the display controller controls the display to display the non-newly arrived sticky note in the form of a newly arrived sticky note.

4. The information processing apparatus according to claim 1,
wherein when the newly arrived sticky note is enlarged on the mount sheet and caused to return to an original size, the display controller controls the display to display the newly arrived sticky note in the form of a non-newly arrived sticky note.

5. The information processing apparatus according to claim 1,
wherein when a group including the newly arrived sticky note and a different sticky note is formed, the display controller controls the display to display the newly arrived sticky note in the form of a non-newly arrived sticky note.

6. The information processing apparatus according to claim 1,
wherein when a combination of at least (i) when a time which has elapsed since reception of the newly arrived sticky note by the first reception unit is equal to or greater than a predetermined value, and (ii) when the newly arrived sticky note is moved on the mount sheet, the display controller controls the display to display the newly arrived sticky note in the form of a non-newly arrived sticky note.

7. The information processing apparatus according to claim 6,
wherein after the display form of the newly arrived sticky note is displayed in the form of a non-newly arrived sticky note, and (i) when a change in contents of the non-newly arrived sticky note is detected, (ii) when the non-newly arrived sticky note is removed from a group, or (iii) when the non-newly arrived sticky note is caused to overlap a different sticky note, the display controller controls the display to display the non-newly arrived sticky note in the form of a newly arrived sticky note.

8. The information processing apparatus according to claim 1,
wherein after the newly arrived sticky note is displayed in the form of a non-newly arrived sticky note, and (i) when a change in contents of the non-newly arrived sticky note is detected, (ii) when the non-newly arrived sticky note is removed from a group, or (iii) when the non-newly arrived sticky note is caused to overlap a different sticky note, the display controller controls the display to display the non-newly arrived sticky note in the form of a newly arrived sticky note.

9. The information processing apparatus according to claim 1, wherein
the processor is further configured to act as a detection unit that detects a user instruction to change the form of the newly arrived sticky note or to process a dynamic change of the newly arrived sticky note, and
the display controller controls the display to display the newly arrived sticky note in the form of a non-newly arrived sticky note, with respect to the at least one of shape, pattern or color, or a dynamic change of the at least one of shape, pattern or color, without regard to the user instruction detected by the detection unit.

10. The information processing apparatus according to claim 1,
wherein the display controller controls the display to display the newly arrived sticky note in the form of a non-newly arrived sticky note without a user instruction to change the form of the newly arrived sticky note into the form of a non-newly arrived sticky note.

11. The information processing apparatus according to claim 1, wherein
the processor is further configured to act as a detection unit that detects that a status of the newly arrived sticky note has changed, and
the display controller controls the display to display the newly arrived sticky note in the form of a non-newly arrived sticky note only when the detection unit detects that the status of the newly arrived sticky note has changed.

12. An information processing apparatus comprising:
a processor configured to act as:
a first reception unit that receives sticky note information indicating a sticky note to be attached to a mount sheet;
a display controller that controls a display to display the sticky note information received by the first reception unit in a form of a newly arrived sticky note on the mount sheet, the form of the newly arrived sticky note and a form of a non-newly arrived sticky note being different from each other in at least one of shape, pattern and color of the sticky note; and
a second reception unit that receives an instruction to move a position of the newly arrived sticky note on the mount sheet,
wherein when the newly arrived sticky note is moved from a position overlapping a different sticky note on the mount sheet, the display controller controls the display to continue displaying the newly arrived sticky note in the form of a newly arrived sticky note.

13. An information processing apparatus comprising:
a processor configured to act as:
a first reception unit that receives sticky note information indicating a sticky note to be attached to a mount sheet;
a display controller that controls a display to display the sticky note information received by the first reception unit in a form of a newly arrived sticky note on the mount sheet, the form of the newly arrived sticky note and a form of a non-newly arrived sticky note being different from each other in at least one of shape, pattern and color of the sticky note; and
a second reception unit that receives an instruction to move a position of the newly arrived sticky note on the mount sheet,
wherein when the newly arrived sticky note is moved together with a different sticky note on the mount sheet while maintaining a positional relationship with the different sticky note, the display controller controls the display to continue displaying the newly arrived sticky note in the form of a newly arrived sticky note.

14. An information processing method comprising:
receiving sticky note information indicating a sticky note to be attached to a mount sheet;
displaying, on a display controlled by a display controller, the received sticky note information in a form of a newly arrived sticky note on the mount sheet, the form of the newly arrived sticky note and a form of a non-newly arrived sticky note being different from each other in at least one of shape, pattern and color of the sticky note;
receiving an instruction to move a position of the newly arrived sticky note on the mount sheet;
detecting a moving speed of the newly arrived sticky note or a pressure of selection of the newly arrived sticky note based on an operation by an operator; and
when the moving speed at a time of termination of a movement has become lower than a previous moving speed or when the pressure at a time of termination of a movement has become higher than a previous pressure, controlling the display, under the control of the display controller, to display the newly arrived sticky note in the form of a non-newly arrived sticky note.

15. A non-transitory computer readable medium storing a program causing a computer to execute a process for information processing, the process comprising:
receiving sticky note information indicating a sticky note to be attached to a mount sheet;
displaying, on a display controlled by a display controller, the received sticky note information in a form of a newly arrived sticky note on the mount sheet, the form of the newly arrived sticky note and a form of a non-newly arrived sticky note being different from each other in at least one of shape, pattern and color of the sticky note;
receiving an instruction to move a position of the newly arrived sticky note on the mount sheet;

detecting a moving speed of the newly arrived sticky note or a pressure of selection of the newly arrived sticky note based on an operation by an operator; and when the moving speed at a time of termination of a movement has become lower than a previous moving speed or when the pressure at a time of termination of a movement has become higher than a previous pressure, controlling the display, under the control of the display controller, to display the newly arrived sticky note in the form of a non-newly arrived sticky note.

16. An information processing apparatus comprising:
a processor configured to act as:
   a first reception unit that receives sticky note information indicating a sticky note to be attached to a mount sheet;
   a display controller that controls a display to display the sticky note information received by the first reception unit in a form of a newly arrived sticky note on the mount sheet, the form of the newly arrived sticky note and a form of a non-newly arrived sticky note being different from each other in at least one of shape, pattern and color of the sticky note; and
   a second reception unit that receives an instruction to move a position of the newly arrived sticky note on the mount sheet,
wherein when the newly arrived sticky note is moved from a position overlapping a different sticky note on the mount sheet, or when the newly arrived sticky note is moved together with a different sticky note on the mount sheet while maintaining a positional relationship with the different sticky note, the display controller controls the display to continue displaying the newly arrived sticky note in the form of a newly arrived sticky note.

* * * * *